United States Patent Office 3,431,195
Patented Mar. 4, 1969

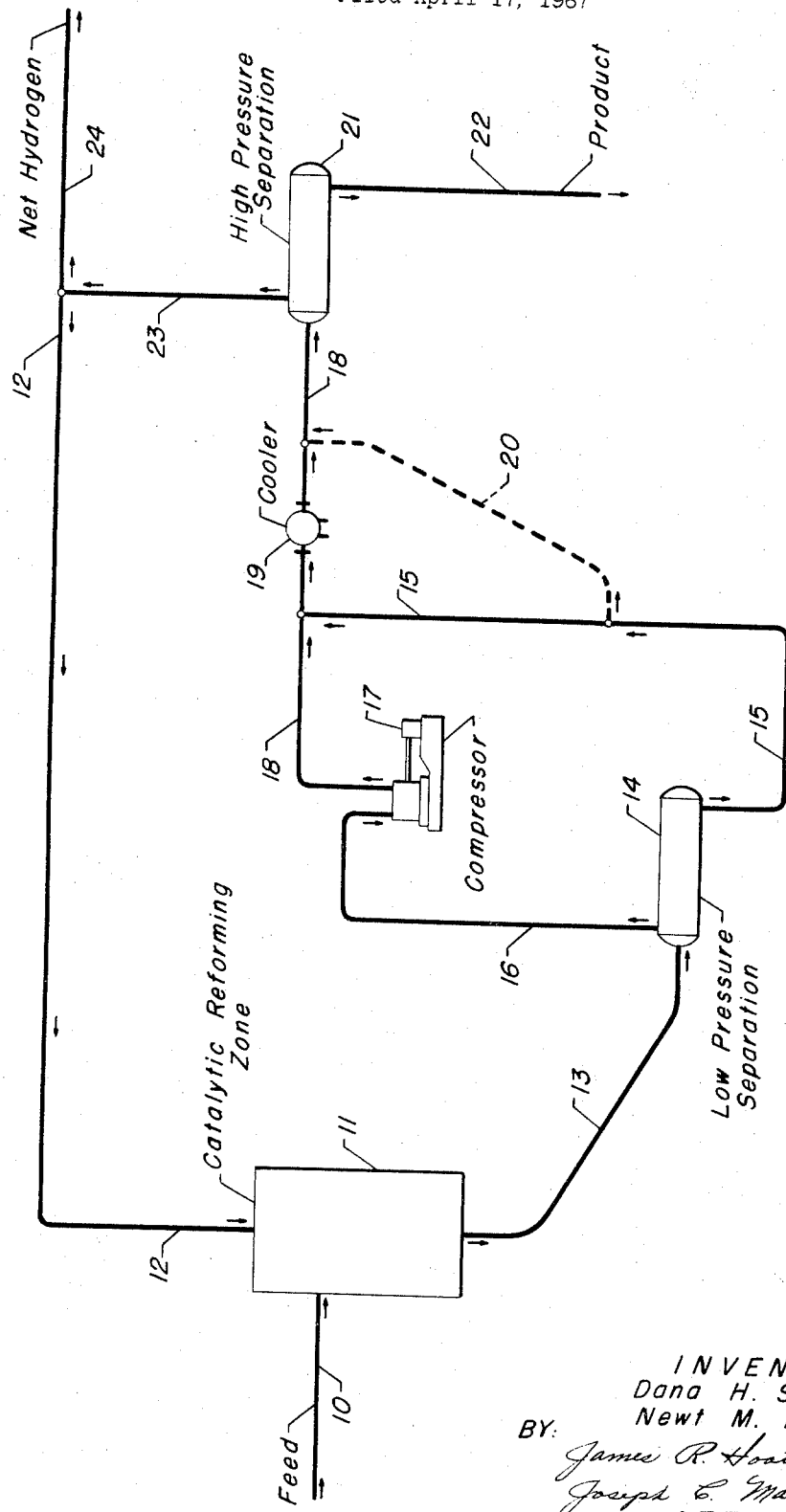

3,431,195
PURIFYING MAKE HYDROGEN IN A CATALYTIC REFORMING PROCESS
Dana H. Storch, Wilmette, and Newt M. Hallman, Mount Prospect, Ill., assignors to Universal Oil Products Company, Des Plaines, Ill., a corporation of Delaware
Filed Apr. 17, 1967, Ser. No. 631,202
U.S. Cl. 208—101
Int. Cl. C10g 35/04, 35/08, 35/00
8 Claims

ABSTRACT OF THE DISCLOSURE

Process for the catalytic reforming of hydrocarbons in the presence of hydrogen, preferably, to produce gasoline boiling range products. Relatively impure hydrogen for recycle purposes is purified by compressing and contacting this hydrogen with a portion of the liquid phase reformed.

BACKGROUND OF THE INVENTION

This invention relates to the dehydrogenation of hydrocarbons. It particularly relates to the catalytic reforming of hydrocarbons to produce gasoline boiling range products. It specifically relates to a process for upgrading hydrogen gas for recycle to the catalytic reforming reaction zone.

It is well known in the art that high quality aromatic hydrocarbons, such as benzene, toluene, and xylene, may be produced by the catalyst reforming process wherein naphtha-containing feedstocks are passed over platinum-containing catalyst in the presence of hydrogen in order to convert the feedstock into aromatic hydrocarbons. One of the predominant reactions in catalytic reforming involves dehydrogenation of naphthenic hydrocarbons. The dehydrogenation function produces a net excess of hydrogen from the process which is available for other uses, such as hydrodesulfurization reactions, and the like. A considerable portion of the hydrogen, however, is required for recycle purposes in order that a proper partial pressure of hydrogen may be maintained in the catalytic reforming zone.

However, the catalytic reforming reaction also involves a hydrocracking function which segments hydrocarbons into relatively low molecular weight hydrocarbons, such as $C_1$, $C_2$, $C_3$, etc. hydrocarbons and in particular the $C_2+$ hydrocarbons, which then become contaminants in the gaseous hydrogen which is to be recycled to the reaction zone. In addition, these contaminants have the effect of lowering the hydrogen purity to such an extent that frequently purification techniques must be used by those skilled in the art before the net hydrogen from the reformer can be used in other chemical reactions requiring relatively high purity hydrogen.

Consequently, it would be desirable to operate the catalytic reforming process so as to produce consistently relatively high purity hydrogen not only for recycle purposes, but also for other uses outside the catalytic reforming system.

SUMMARY OF THE INVENTION

Therefore, it is an object of this invention to provide a process for the dehydrogenation of hydrocarbons.

It is another object of this invention to provide a process for the catalytic reforming of hydrocarbons to produce gasoline boiling range products.

It is a particular object of this invention to provide a process for the catalytic reforming of hydrocarbons wherein the net hydrogen produced is of relatively high purity.

It is a specific object of this invention to provide a catalytic reforming process in a more facile and economical manner.

Accordingly, the present invention provides a process for dehydrogenation which comprises dehydrogenatnig a dehydrogenatable material in the presence of hydrogen to yield an effluent containing hydrogen admixed with dehydrogenated normally liquid product; separating said effluent at relatively low pressure into a gaseous stream comprising relatively impure hydrogen and a liquid stream containing dehydrogenated product; compressing said gaseous stream to a relatively high pressure; admixing the compressed gaseous stream with at least a portion of said liquid stream; separating said admixture into a gaseous stream comprising relatively pure hydrogen and a liquid stream containing dehydrogenated product; and recovering dehydrogenated product in high concentration.

Another embodiment of this invention includes the process hereinabove wherein said relatively pure hydrogen stream is returned to the dehydrogenation reaction zone.

The art of catalytic reforming and the broad art of dehydrogenation of hydrocarbons is well known to those skilled in the art and need not be discussed in greater detail herein. However, suitable charge stocks for use in the catalytic reforming operation to produce gasoline boiling range products, such as aromatic hydrocarbons, are those which contain both naphthenes and paraffins in relatively high concentration. Suitable feedstocks include narrow boiling fractions, such as naphtha fractions, as well as substantially purer materials, such as cyclohexane, methylcyclohexane. The preferred class of suitable feedstocks includes primarily straight-run gasolines such as the light and heavy naphthas. It is distinctly preferred to use a naphtha fraction boiling between, say 100° F. and 400° F. as the feedstock to the catalytic reforming operation The preferred types of catalysts for use in the catalytic reforming process are well known to those skilled in the art and, typically, comprise platinum on an alumina support. These catalysts may contain substantial amounts of platinum, but for economic and quality reasons, the platinum will usually be within the range of from 0.05% to about 5.0% by weight platinum.

Satisfactory operating conditions for the catalytic reforming operation include the presence of the hereinabove mentioned catalyst and temperatures of from about 500° F. to about 1050° F., preferably, from 600° F. to 1000° F.; pressures from about 50 p.s.i.g. to about 1200 p.s.i.g. preferably, from about 200 p.s.i.g. to 600 p.s.i.g.; a weight hourly space velocity within the range of about 0.2 to about 40; and the presence of a hydrogen-containing gas equivalent to a hydrogen-to-hydrocarbon mol ratio of about 0.5 to about 15.0.

It is to be noted from the description presented thus far that the present invention provides, in substance, for the compressing of the hydrogen gas vented from the separator and then contacting the compressed gas with at least a portion of the liquid product from the same separator. This admixture, at a relatively high pressure, is then preferably cooled and passed into another separation zone from which is yielded a relatively pure hydrogen-containing stream at least part of which is suitable for recycle to the catalytic reforming zone and the remainder of which is suitable for use in other hydrogen consuming operations, and a yield of a normally liquid product containing the reformed hydrocarbons.

In the practice of this invention it is distinctly preferred that the relatively high pressure be at least 50 p.s.i.g. greater than the relatively low pressure. In other aspects it is distinctly preferred that the catalytic reforming separation be carried out at the lower end of the pressure scale rather than at the higher end, to wit: a pressure of between 200 and 300 p.s.i.g. This means then that the pressure should be suitable for elevating the gaseous phase at least 50 p.s.i.g. and more typically, 100 p.s.i.g. above the separator pressure following the reaction zone. Although not mentioned in detail, it is to be noted that the liquid phase from the relatively low pressure separation zone will have to be pumped into the relatively high pressure discharge line from the compressor so that the final separation can be made at the relatively high pressure.

The unique features of this invention are best understood by a comparison with well known prior art schemes. Normally, the prior art scheme will operate the catalytic reforming operation at 300 to 450 p.s.i.g. The separator following the reaction zone is at substantially the same pressure, allowing for pressure drop through the system. The prior art scheme separates the hydrogen-containing phase from this separator and generally passes a portion of this hydrogen back to the reaction zone. Since the entire catalytic reforming system has significant pressure drop, the recycle hydrogen gas stream must be compressed in order to overcome the pressure drop. The desired reformed product, according to the prior art schemes, is removed from the same separator and passed into recovery means such as a solvent extraction system. With reference to the description of this invention, it can be seen that the present invention has added the features of compressing the gaseous stream, admixing the compressed gas, preferably, with all of the liquid product, and then making an additional separation of the hydrogen gas at a relatively high pressure. The effect of this compression and contacting at the higher pressure with the liquid product successfully removes a significant portion of the hydrocarbon contaminants from the hydrogen gas stream without increasing either capital investment costs or operating expenses. In fact, as will be more fully discussed hereinbelow, the practice of this present invention results in considerable economy in both capital expenses and operating expenses over the typical and conventional prior art scheme.

The invention may be more fully understood with reference to the appended drawing which is a schematic representation of apparatus for practicing one embodiment of the invention.

DESCRIPTION OF THE DRAWING

A petroleum-derived naphtha fraction is introduced via line 10 into catalytic referoming zone 11 which contains a platinum catalyst and is operated under conventional reforming conditions. To illustrate the mechanics of this invention, however, the operating pressure of this catalytic reforming zone is chosen to be relatively low, say, about 250 p.s.i.g. The total effluent from the catalytic reforming zone is withdrawn via line 13 and passed into low pressure separation zone 14.

The pressure in separation zone 14 is substantially the same as that maintained in the reaction zone 11, although such pressure can be considerably lower than reaction pressure due to pressure drop through the system. Sufficient residence time is imposed on zone 14 so that a relatively impure hydrogen stream is separated via line 16 and a normally liquid product stream is separated and removed via line 15. The material in line 15 contains the reformed hydrocarbons, to wit: gasoline boiling range hydcorbons such as benzene, toluene, and xylene.

The relatively impure hydrogen-containing stream in line 16 is passed into compressor 17 wherein the pressure is raised at least 50 p.s.i.g. and, preferably, about 150 p.s.i.g. The compresed hydrogen-containing gaseous stream is admixed with at least a portion of the reformed hydrocarbon fraction from line 15 and the admixture is then passed into cooler 19. If desired, for temperature control purposes, a portion of the liquid hydrocarbon stream may be diverted around cooler 19 via line 20. The cooled and compressed liquid hydrocarbons and hydrogen are next passed into relatively high pressure separation zone 21.

Suitable conditions are maintained in separation zone 21 sufficient to yield a gaseous stream comprising relatively pure hydrogen which is removed via line 23 and to yield a liquid product stream containing reformed hydrocarbons which are removed via line 22 for further handling by means well known to those skilled in the art.

A portion of the upgraded hydrogen stream is recycled to the catalytic reforming zone via line 12. The remainder of the upgraded hydrogen stream is the net hydrogen produced and is removed from the process via line 24 for other uses which require hydrogen such as a hydrodesulfurization reaction.

As previously mentioned, the present invention permits the upgrading of the off-gas hydrogen for recycle purposes at a surprisingly lower cost. The following example is furnished to demonstrate the lower cost achievable by the practice of the present invention.

Example

A commercial scale catalytic reforming plant was designed for a capacity of about 25,000 barrels per stream day of naphtha feedstock. Those skilled in the art will recognize that this plant will require certain well known pieces of equipment in addition to pumps, compressors, valves, etc. The purpose of this example is to provide those skilled in the art with basic economic assessment of a plant designed and operated in accordance with the present invention and a plant designed and operated in accordance with the prior art process previously mentioned hereinabove. By conventional economic analysis it was found that the present inventive scheme saved $48,000 per year in operating expenses for fuel and saved about $80,000 per year in operating expenses for motive power to drive major pumps and compressors, for a total savings of about $128,000 per year over the typical prior art scheme.

In addition to the dollar value of savings calculated to show the advantages of the present invention over the prior art there is also achieved other advantages by the practice of the present invention. These other advantages include such items as lower charge stock heater costs, lower combined feed exchanger costs, lower effluent condenser costs, lower compressor costs, lower driver costs, and lower surface lower condenser costs. Those skilled in the art of designing plants such as these are familiar with these terms and thus, more detailed description of them will not be presented herein. It was found that operating expenses are also lower and include lower power requirements because of lower compressor horsepower requirements, lower fuel consumption, etc.

Without unduly complicating the economic analysis and without presenting detailed calculations thereof, suffice to say that it was surprising to fined that the present invention would effect such considerable economies of operation. As those skilled in the art know well, economic analyses are relative and depend upon the particular economic bench marks important to an individual processor. Other obvious economic factors include charge stock characteristics, chosen operating conditions, desired product quality, etc. All of these items, of course, influence the magnitude of any economic evaluation.

However, the practice of the present invention achieves its greatest economy for those operations which produce a relatively impure hydrogen off-gas stream; for example, those operations that produce hydrogen off-gas at a purity of less than 80% by volume, and typically, in the range from 50% to 70% by volume. These "impure hydrogen" operations normally are the result of processing feedstocks to the catalytic reforming zone which are relatively low in naphthenic hydrocarbon content, such as about 10% to 15% by volume naphthenes. On the other hand, it must be recognized that benefit is achieved in the practice of this invention, even in those processes which yield as high as 90% by volume hydrogen from the first separator. These relatively "high purity" hydrogen operations are normally the result of processing feedstocks to the catalytic reforming zone which contain from 60% to 70% by volume naphthenic hydrocarbons. In virtually every case, the practice of the present invention will produce higher purity recycle hydrogen gas.

PREFERRED EMBODIMENT

Therefore, from the detailed description presented hereinabove, a preferred embodiment of this invention provides an improvement in a process for catalytic reforming of hydrocarbons in the presence of hydrogen to produce high quality gasoline boiling range products wherein the hydrogen off-gas for recycle purposes is relatively high in molecular weight which improvement comprises the steps of: (a) introducing the hydrogen-containing effluent from the reforming reaction zone into a relatively low pressure separation zone; (b) withdrawing from said low pressure zone a gaseous stream comprising hydrogen contaminated with $C_2+$ hydrocarbons and a liquid stream containing relatively high quality gasoline boiling range products; (c) compressing said gaseous stream to a relatively high pressure; (d) admixing the high pressure gaseous stream with at least a portion of said liquid stream; (e) introducing said admixture into a relatively high pressure separation zone; (f) withdrawing from said high presssure zone a gaseous stream containing hydrogen having reduced contaminant content and a liquid product stream; and, (g) returning at least a portion of said gaseous stream from the high pressure separation zone to the reforming reaction zone.

Another specifically preferred embodiment of this invention includes the improvement hereinabove wherein said admixture is cooled prior to introduction into said high pressure separation zone.

A distinctly preferred embodiment of this invention includes the improvements hereinabove wherein said relatively high molecular weight is greater than 10 and wherein said relatively low pressure is less than 350 p.s.i.g.

The invention claimed:

1. Process for dehydrogenation which comprises dehydrogenating a dehydrogenatable material in the presence of hydrogen to yield an effluent containing hydrogen admixed with dehydrogenated normally liquid product; separating said effluent at relatively low pressure into a gaseous stream comprising relatively impure hydrogen and a liquid stream containing dehydrogenated product; compressing said gaseous stream to a pressure higher than said low pressure; admixing the compressed gaseous stream with at least a portion of said liquid stream; separating said admixture into a gaseous stream comprising relatively pure hydrogen and a liquid stream containing dehydrogenated product; and, recovering dehydrogenated product in high concentration.

2. Process according to claim 1 wherein said relatively pure hydrogen stream is returned to the dehydrogenation reaction zone.

3. Process according to claim 2 wherein said high pressure is at least 50 p.s.i.g. greater than said relatively low pressure.

4. In a process for catalytic reforming of hydrocarbons in the presence of hydrogen to produce high quality gasoline boiling range products wherein the hydrogen off-gas for recycle purposes is relatively high in molecular weight, the improvement which comprises the steps of:
  (a) introducing the hydrogen-containing effluent from the reforming reaction zone into a relatively low pressure separation zone;
  (b) withdrawing from said low pressure zone a gaseous stream comprising hydrogen contaminated with $C_2+$ hydrocarbons and a liquid stream containing relatively high quality gasoline boiling range products;
  (c) compressing said gaseous stream to a pressure higher than said low pressure;
  (d) admixing the high pressure gaseous stream with at least a portion of said liquid stream;
  (e) introducing said admixture into a relatively high pressure separation zone;
  (f) withdrawing from said high pressure zone a gaseous stream comprising hydrogen having reduced contaminant content and a liquid product stream; and,
  (g) returning at least a portion of said gaseous stream from the high pressure separation zone to the reforming reaction zone.

5. Improvement according to claim 4 wherein said admixture is cooled prior to introduction into said high pressure separation zone.

6. Improvement according to claim 4 wherein said high pressure is at least 50 p.s.i.g. greater than said relatively low pressure.

7. Improvement according to claim 6 wherein said relatively high molecular weight is greater than 10.

8. Improvement according to claim 6 wherein said relatively low pressure is less than 350 p.s.i.g.

References Cited

UNITED STATES PATENTS

| 2,265,845 | 12/1941 | Kuhl | 208—346 |
|---|---|---|---|
| 2,776,247 | 1/1957 | Anhorn et al. | 208—136 |
| 2,782,141 | 2/1957 | King | 208—346 |
| 2,985,583 | 5/1961 | Gilmore | 208—101 |
| 3,258,420 | 6/1966 | Dalson et al. | 208—138 |
| 3,296,118 | 1/1967 | Czajkowski et al. | 208—138 |

HERBERT LEVINE, *Primary Examiner.*

U.S. Cl. X.R.

208—138, 346